United States Patent [19]

Liebler et al.

[11] Patent Number: 4,576,870

[45] Date of Patent: Mar. 18, 1986

[54] METHOD FOR MAKING MULTILAYERED RESIN BODIES HAVING UV-PROTECTION AND THE RESULTANT PRODUCTS

[75] Inventors: Ralf Liebler, Darmstadt; Siegmund Besecke, Seeheim-Jugenheim; Manfred Munzer, Bensheim, all of Fed. Rep. of Germany

[73] Assignee: Röhm GmbH, Darmstadt, Fed. Rep. of Germany

[21] Appl. No.: 594,326

[22] Filed: Mar. 28, 1984

[30] Foreign Application Priority Data

Apr. 8, 1983 [DE] Fed. Rep. of Germany ....... 3312611

[51] Int. Cl.$^4$ ................... B32B 27/08; B32B 31/30; B29C 47/06
[52] U.S. Cl. .................. 428/515; 264/171; 428/412
[58] Field of Search ............... 264/171; 428/515, 412

[56] References Cited

U.S. PATENT DOCUMENTS

| | | | |
|---|---|---|---|
| 3,043,709 | 7/1962 | Amborski | 117/7 |
| 3,107,199 | 10/1963 | Tocker | 161/231 |
| 3,159,646 | 12/1964 | Milionis et al. | 260/308 |
| 3,399,173 | 8/1968 | Heller et al. | 260/47 |
| 3,582,398 | 6/1971 | Ringler | 117/33.3 |
| 3,594,264 | 7/1971 | Urban | 161/165 |
| 4,178,303 | 12/1979 | Lorenz et al. | 260/465 |
| 4,202,834 | 5/1980 | Gruber et al. | 260/465 |
| 4,247,714 | 1/1981 | Gruber et al. | 560/221 |
| 4,260,768 | 4/1981 | Lorenz et al. | 548/261 |
| 4,260,809 | 4/1981 | Gruber et al. | 560/138 |
| 4,307,240 | 12/1981 | Ching | 556/415 |
| 4,316,033 | 2/1982 | Ching | 548/110 |
| 4,475,241 | 10/1984 | Mueller et al. | 264/171 X |
| 4,503,180 | 3/1985 | Ching | 428/412 X |
| 4,525,426 | 6/1985 | Anthony | 428/412 X |

FOREIGN PATENT DOCUMENTS

| | | |
|---|---|---|
| 629480 | 3/1963 | Belgium . |
| 1609777 | 4/1970 | Fed. Rep. of Germany . |
| 2651511 | 5/1977 | Fed. Rep. of Germany . |
| 3120848 | 1/1982 | Fed. Rep. of Germany . |
| 1256103 | 12/1971 | United Kingdom . |
| 2028228A | 3/1980 | United Kingdom ............ 264/171 |
| 2076695 | 12/1981 | United Kingdom . |
| 2077280 | 12/1981 | United Kingdom . |
| 2078242 | 1/1982 | United Kingdom . |

OTHER PUBLICATIONS

Kunststoff-Handbuch, vol. IX, Carl Hanser Verlag, Munich (1975) p. 392-393.

Primary Examiner—Philip Anderson
Attorney, Agent, or Firm—Curtis, Morris & Safford

[57] ABSTRACT

A method for making multilayered synthetic resin bodies by the coextrusion of thermoplastic molding compounds wherein at least one of the layers in the extruded body is to be protected against UV light, which comprises extruding at least one layer from a thermoplastic molding compound that is formed entirely or predominantly of a copolymer formed between monomers comprising in their molecules groups or structures which, because of their characteristic absorption of ultraviolet light, provide protection against ultraviolet light, together with other, known, monomers.

16 Claims, No Drawings

METHOD FOR MAKING MULTILAYERED RESIN BODIES HAVING UV-PROTECTION AND THE RESULTANT PRODUCTS

The present invention relates to formed multilayered synthetic resin bodies which are protected against the action of ultraviolet radiation and relates particularly to such bodies made of polycarbonate resin.

The stabilization of synthetic resins against the harmful effects of UV light has proved necessary in many cases. This is true also of polycarbonate resins, which are distinguished by good light transmittance, mechanical strength, and a high deflection temperature. Even the monograph "Polycarbonates" by W. F. Christopher and D. W. Fox (Reinhold Publishing Corporation, New York) points to the structural property of polycarbonate which enables it to act as a UV absorber. The destructive effect of UV radiation can extend to a depth ranging from 0.07 to 0.11 cm. In such layers the effect frequently manifests itself at first as a yellowing. It is further noted that the known UV stabilizers are not compatible with polycarbonate resins at the temperatures required for extrusion and melting.

Under certain conditions, bisphenol-A polycarbonate can be effectively stabilized with a number of commercial UV stabilizers. Best suited are the weakly colored benzotriazole derivatives, followed by a few derivatives of benzophenone. These, of course, are used primarily for the UV stabilization of uncolored or clear colored bisphenol-A polycarbonate. However, the addition of UV stabilizers to the polymer melt gives rise to stability and dispersion problems. When extraneous substances such as UV absorbers are added, there is a possibility that the mechanical properties may be adversely affected. Moreover, the high processing temperatures (up to about 330° C.) must not result in the loss of UV stabilization.

U.S. Pat. No. 3,043,709 proposes the coating of a polymeric substrate with a UV absorber followed by heating to temperatures above the melting point. The absorber is said to penetrate into the surface of the polymeric substrate during the course of the process. In practice, of course, heating may result not only in penetration by the UV absorber but also in its decomposition or discoloration.

According to published German patent application DOS No. 19 53 276, the polycarbonate is therefore protected by coating at least one of its surfaces with an acrylate copolymer film whose thickness ranges from 0.025 to 0.25 mm and which contains from 0.25 to 5.0 weight percent, based on the weight of the acrylate film, of a UV absorber in homogeneously dispersed form.

In U.S. Pat. No. 3,582,398, a polycarbonate coated with polymethyl methacrylate (PMMA) is claimed. The coating material preferably contains a UV absorber. Coating is effected by applying a solution of the PMMA in an inert, volatile solvent and evaporating the solvent.

The coating by coextrusion of polycarbonate plates with PMMA layers incorporating UV absorbers is known from British Pat. No. 2,028,228.

Polymerizable monomers which are absorbent in the UV range are already known. (See, for example, S. Yoshida et al., Makromol. Chem. 183, 259–279 [1982].) These generally belong to the classes of proven UV absorbers. They are mostly derived from 2-hydroxybenzophenone, 2-hydroxyphenyl benzotriazole, alpha-cyano-beta-phenylcinnamic acid, 4-aminobenzoic acid, salicylic acid, and oxalanilides and contain polymerizable units such as a vinyl, allyl, acryloyl, or methacryloyl group. As components of certain polymers or copolymers, they may have a stabilizing effect. In the literature, the stabilization of polyethylene by graft copolymerization with UV-absorbing monomers is described. Chem. Abstr. 93, 72000d proposes the stabilization of low-density polyethylene by surface grafting with 2-hydroxy-4(3-methacryloxy-2-hydroxypropoxy)-benzophenone. (According to Chem. Abstr. 94, 140375, N-methacryloyl benzoxazolinone is also suited for this purpose.) A similar approach is outlined in Chem. Abstr. 94, 48206q. The surface grafting of polyvinyl chloride with 2-hydroxy-4-(3-methacryloxy-2-hydroxypropoxy) benzophenone is the subject of a paper summarized in Chem. Abstr. 86, 121979k. Copolymers of chloroprene and styrene with 2-benzothiazolethiol methacrylate can be prepared according to Chem. Abstr. 95, 63499b. They can be used as vulcanization accelerators for neoprene and SKS-30 rubber. The stabilization of polyvinyl chloride with benzothiazolinethione methacrylate is taught in Chem. Abstr. 92, 59614f.

The use of 4-vinyl-alpha-cyano-beta-phenylcinnamic ethyl ester as a monomer in homo- and co-polymers with styrene and methyl methacrylate (MMA) is described in Chem. Abstr. 95, 187714n. Similarly, 6,8-dimethyl-4-oxo-5-chromanyl methacrylate has been copolymerized with MMA or vinyl chloride. (Chem. Abstr. 93, 95740y.) From published German patent application DOS No. 15 20 458, a copolymer of alpha-olefins and an ortho-hydroxy-benzophenone acrylate or methacrylate is known. Such copolymers are said to lend themselves to the production of self-supporting films, supported films, and the like. Moreover, 2-hydroxybenzophenone derivatives with acryloyloxy or methacryloyloxy groups in the 4-position are proposed for use as comonomers with styrene, acrylonitrile, and/or MMA. (Chem. Abstr. 96, 53957f.)

Copolymerization of 6,8-dimethyl-4-oxo-5-chromanyl methylacrylate with MMA, among others, is described in Chem. Abstr. 90, 169084z. According to Europ. Polym. J. 1977 (13), 915–919 (Chem. Abstr. 88, 191967v), 4-benzoyl-3-hydroxyphenyl acrylate can be copolymerized with ABS.

U.S. Pat. No. 4,260,768 proposes 2-(2H-benzotriazol-2-yl)-4-alkylphenol acrylic ester as a UV absorber which is copolymerizable with styrene or vinylpyrrolidone, for example. Copolymerizable 4-acryloyloxybenzene-1-alkyl-1-phenylhydrazones are described as UV stabilizers in U.S. Pat. No. 4,247,714 and 4-alkoxy-2'-acryloxybenzazines in U.S. Pat. No. 4,260,809. Further comonomers are 2-cyano-3,3-diphenylacryloxyalkyleneethylene ethers (U.S. Pat. No. 4,202,834) and acrylic esters (U.S. Pat. No. 4,178,303). Sterically hindered piperidine derivatives have also been proposed (cf. published German patent applications DOS No. 26 51 511, DOS No. 22 58 752, DOS No. 20 40 983, and DOS No. 23 52 606).

Published German patent application DOS No. 31 21 385 describes coated objects consisting of a solid substrate to the surface of which a primer coat and a cured top coat of a heat resistant organopolysiloxane filled with colloidal silicon dioxide has been applied. The primer for the siloxane contains, among other substances, from 2 to 10 parts by weight of a high molecular weight thermoplastic methacrylic ester polymer or copolymer selected inter alia from copolymers of a $C_1$-$C_6$ alkyl methacrylate and a reaction product of glycidyl methacrylate, and a hydroxybenzophenone UV screening agent. Published German patent applications DOS No. 31 20 870, 31 20 847, 31 20 848 and 31 20 853 also relate to the use of UV absorbers in the course of the silicone coating of thermoplastics.

From the large number of pertinent publications it is apparent that the art has sought to solve the existing problems by continually developing new, improved UV absorbers or other primary systems for the coating of synthetic resins.

The problems with which the present invention is concerned will now be described in greater detail with reference to polycarbonate resins.

The efforts made in the art to protect polycarbonates against the harmful effects of UV radiation have involved either the addition of UV absorbers to the polycarbonates or the coating of the latter with layers incorporating UV absorbers. Experience has shown that both approaches create almost as many problems as they solve. One factor is the insufficient compatibility of existing UV absorbers with polycarbonates at the high temperatures necessarily employed in processing polycarbonates. On the other hand, coating (by coextrusion, laminating, or simply coating, etc.) is worthwhile only when it can be depended on to provide effective, reliably reproducible protection.

Thus, there has been a need for protecting sensitive formed synthetic resin articles made of polycarbonate, for example against the harmful effects of UV radiation, and to improve their weather resistance without risking UV absorber losses or the attendant uncertainties concerning the actual protection obtained.

This need is filled by the method according to the present invention wherein a multilayered synthetic resin body having at least one layer protected against UV light is prepared by the coextrusion of thermoplastic molding compounds, at least one of which entirely or predominantly comprises a copolymer of a monomer the molecules of which comprises groups or structures or constituents which, because of their characteristic absorption of ultraviolet light, provide protection against UV light, together with another, known comonomer.

From what has been said above, it should be apparent that the need for the protective coating of the synthetic resin substrates to be treated by the process of the invention stems from their sensitivity to UV radiation. In all other respects, such a mechanical, thermal and optical properties, and processability, the characteristics of the thermoplastics to be protected by and large meet commercial requirements, except, in many cases, for scratch resistance. (In some cases, the formed multilayer plastic articles manufactured in accordance with the invention can be provided with a scratch resistant coating.)

The formed multilayer synthetic resin bodies obtained by the process of the invention thus will, except for the features set forth in the present claims, correspond to those conventionally produced by extrusion, such as resin sheets, plates, panels, or foils, but also such complex formed articles as the so-called double- and triple-walled panels (cf. published German patent application DOS No. 16 09 777). In the simplest case, the formed multilayer synthetic resin bodies which can be manufactured in accordance with the invention may be regarded as consisting primarily of the resin material to be protected, this being the main component which determines their form. To those surfaces of these bodies that may be exposed to UV light, a layer protecting them against UV radiation is applied by coextrusion. At the very least, the formed multilayer resin bodies will thus consist of two, and possibly three, layers, that is of the main component which determines the form and is to be protected and of one or two layers which cover its surface and comprise constituents providing protection against UV light. However, in keeping with the known extrusion methods, the form determining component itself may be extruded in several layers, which then usually are formed of different thermoplastic molding compounds that are compatible with one another or are coextrudable by the use of adhesion promoters. The layer to be protected usually has a thickness ranging from less than one millimeter to several centimeters, depending on the end use of the foil, sheet, plate, etc.

The layer comprising constituents which provide protection against UV light usually is of a thickness that is a mere fraction of the thickness of the other layers. Its thickness is determined by its protective function, for one thing, and must be sufficient to protect subjacent layers adequately against UV light. Other factors affecting its thickness are the requirements concerning the adhesion and mechanical and optical behavior as well as the processing conditions in coextrusion. The protective function, in turn, is dependent on the type and amount of UV absorber contained in the copolymer P. A guide value is a thickness of this layer ranging from 10 to 100 microns, and preferably from 15 to 25 microns.

Suitable materials for coextrusion are the known extrudable thermoplastic molding compounds, and in particular polycarbonate (PC), polyacrylates, polyvinyl chloride (PVC), polyurethane (PU), polyamides, olefin copolymers, styrene polymers, styrene-butadiene rubber (SBR), ethylene/vinyl acetate (EVA) copolymers, and acrylonitrile-butadiene-styrene (ABS) terpolymers.

The thermoplastic forming masses from which a UV protective layer is formed comprise from 51 to 100 percent by weight of a copolymer, hereinafter referred to as polymer P, containing a monomer or monomers protecting against UV. The balance, if any, (since the molding compound may comprise only polymer P), may be a compatible homopolymer or copolymer of monomers of the type which are present in polymer P as comonomers together with the UV-protective monomer and which, thus, are copolymerizable or graft copolymerizable with said protective monomer. (The molding compound may also comprise minor amounts of other conventional additives facilitating extrusion.)

The polymers which can be blended with polymer P in forming the molding compound and which are modified, by the inclusion therein of UV-protecting monomer, to form polymer P are primarily polyacrylates, PVC, olefin polymers, styrene polymers, and ABS resins.

The selection of the resin for coextrusion is made by the criteria of the prior art. The compatibility of resins from the point of view of mutual adhesion in coextrusion has been described, for example, in a paper by J. E. Johnson published in Kunststoffberater 10, 538–541 (1976). Olefins, for example, exhibit good adhesion to one another and to EVA. Styrenes have good adhesion for ABS, SBR, and EVA. PVC has good adhesion for ABS, PVC, EVA, and acrylates. And acrylates have good adhesion for ABS, PVC, and PC. Of course, the adhesion of similar materials to one another usually is good.

The monomers comprising groups or structures which provide protection against UV light and which may be used in accordance with the invention usually contain groups which can be depended on to provide not less than 10 percent absorption over the wavelength range from 250 to 350 nm under standard conditions (concentration=0.002 weight percent in chloroform, for spectroscopy, with a layer thickness of 5 mm). By definition they differ from the aromatic structural units of the usual thermoplastics, such as polycarbonate, polystyrene, etc.

The monomers containing groups which provide protection against UV light may be incorporated in the copolymer P in an amount which usually ranges from 0.1 to 20 weight percent, preferably ranges from 3 to 12 weight percent, and more particularly from 5 to 10 weight percent, based on the total monomers, in accordance with the known rules of polymerization and, to some extent, depending on the chemical character of the monomers. The polymerizable unit usually is an acryl, methacryl, vinyl, or allyl group which is susceptible to free radical polymerization in the usual manner.

Particularly advantageous is the incorporation of monomers of the formula

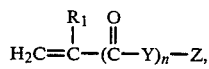

wherein $R_1$ is hydrogen or methyl, n is 0 or 1, Y is oxygen or $-NR_2-$ wherein $R_2$ is hydrogen or $(C_1-C_6)$alkyl, and Z is (a) a 2-hydroxybenzylphenyltriazole of the formula

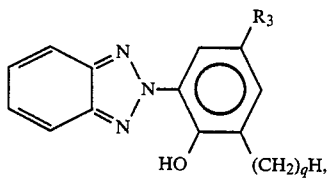

wherein $R_3$ is hydrogen or $(C_1-C_{12})$alkyl and q is 0 or an integer from 1 to 4, or Z is such a compound which is halogen substituted or is such a compound wherein benzotriazole is substituted $(C_1-C_4)$ alkyl, wherein such Z may be linked into the monomer by way of the hydroxy oxygen if n is 0, by way of $-(CH_2)_q-$ where q is other than 0, or directly by way of phenyl when q is 0;

(b) a 2-hydroxybenzophenone or 2-hydroxyacetophenone of the formula

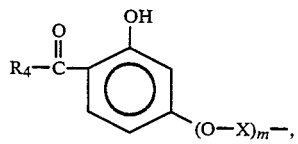

wherein m is 0 or 1, X is $(C_1-C_4)$-alkylene or such alkylene substituted by hydroxy, and $R_4$ is phenyl or methyl;

(c) an alpha-cyano-beta, beta-acryloyloxy compound of the formula

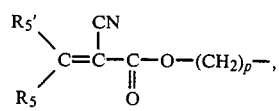

wherein p is an integer from 1 to 4 and $R_5$ and $R_5'$ are independently phenyl or phenyl substituted by $(C_1-C_4)$-alkyl;

(d) a benzoic acid ester of the formula

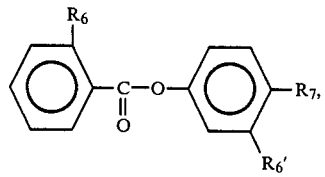

wherein one of $R_6$ and $R_6'$ is hydroxy and the other is hydrogen, $R_7$ is hydrogen or $(C_1-C_{10})$-alkyl, and this Z may be linked into the monomer by way of any unsubstituted position in either phenyl;

(e) an oxalanilide of the formula

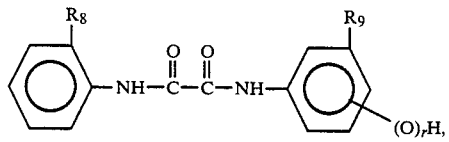

wherein $R_8$ and $R_9$ are hydrogens, $(C_1-C_8)$-alkyl, or $(C_1-C_8)$-alkoxy, r is 0 or 1, and this Z may be linked into the monomer by way of the hydroxy oxygen when r is 1 and when n is 0 or by way of any unsubstituted position in either phenyl when r is 0 or 1;

(f) when n is 0, para-aminobenzyoyloxy of the formula

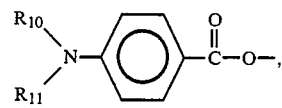

wherein $R_{10}$ and $R_{11}$ are hydrogen or $(C_1-C_6)$-alkyl; and 6,8-dialkyl-4-oxo-5-chromanyl of the formula

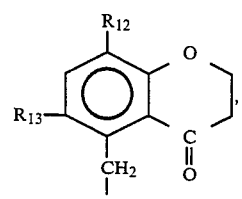

wherein $R_{12}$ and $R_{13}$ are $(C_1-C_4)$-alkyl.

To the extent that the monomers of formula I may carry halogen substituents, these should be bromine or chlorine.

Particularly well suited components of formula I (a) are 2-hydroxyphenylbenzotriazole compounds, which may be prepared as described in U.S. Pat. Nos. 3,159,646 and 3,399,173, for example. These include: 2-(2'-hydroxy-3'-methacryloylamidomethyl-5'alkyl-phenyl)-benzotriazole (wherein the alkyl is methyl or octyl, for example), 2-(2'-hydroxyphenyl)-5-methacryloylamidobenzotriazole, 2-(2'-hydroxyphenyl)-5-methacryloylamidomethylbenzotriazole, and also 2-(2-hydroxy-5-vinylphenyl)-2H-benzotriazole.

The compounds of formula I(b) are also very suitable, and in particular derivatives of 2-hydroxybenzophenone obtainable as described in U.S. Pat. No. 3,107,199 for example, and especially 2-hydroxy-4-methacryloxybenzophenone, 2-hydroxy-4-acryl-oxybenzophenone, 2-hydroxy-4-methacryloxy-5-tert butylbenzophenone, 2-hydroxy-4-methacryloxy-2',4'-dichloro-benzophenone, 2-hydroxy-4-(3-methacryloxy-2-hydroxypropoxy) benzophenone, 4-(allyloxy)-2-hydroxybenzophenone, 3-allyl-2-hydroxy-4,4'-dimethoxybenzophenone, and 2,4-dihydroxy-4'-vinylbenzophenone, as well as derivatives of hydroxyacetophenone obtainable as described in Belgian Pat. No. 629,480.

The compounds of formula I(c) are also suitable, and particularly vinyl compounds such as 4-ethyl-alphacyano-beta-phenylcinnamic vinyl esters, unsaturated ethers such as 2-cyano-3,3-diphenylacryloxy)alkylene ethyl ether, and acrylic acid or methacrylic acid derivatives such as (2-cyano-3,3-diphenylacryloxy)alkyleneacrylic esters and 2-(acryloyl)oxyethyl-2-cyano-3,3-diphenylacrylate.

The preparation of said monomers of formula I is known in the literature and these monomers can be prepared by prior art processes or analogously to known processes. The amount of the monomers comprising groups, structures, or constituents which provide protection against UV light in their molecular structure, and in particular of the compounds of formula I, ranges from 0.1 to 20 weight percent, and preferably from 3 to 12 weight percent, and more particularly from 5 to 10 percent, of the total monomers which form the thermoplastic molding compound comprising constituents providing protection against UV light, that is to say from 0.1 to 20 weight percent of the monomers of copolymer P where P is the sole component of the molding compound.

An embodiment in which copolymer P is an acrylic resin is of particular importance. In keeping with the prior art, these acrylic resins are extrudable polymers or copolymers of one or more esters of acrylic and/or methacrylic acid of the general formula

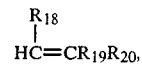

wherein $R_1'$ is hydrogen or methyl and $R_{14}$ is alkyl having from 1 to 8 carbon atoms, or phenyl, or aralkyl having from 7 to 12 carbon atoms, in an amount ranging from 70 to 99.9 weight percent, based on the acrylic resin (copolymer P), and optionally monomers of the general formula

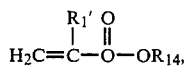

wherein $R_1''$ is hydrogen or methyl, B is —O— or =$NR_{15}$, A is alkylene having from 2 to 6 carbon atoms, and Q is hydroxy or is methoxy to hexyloxy or is —$NR_{16}R_{17}$, $R_{15}$ being hydrogen or alkyl having from 1 to 6 carbon atoms and $R_{16}$ and $R_{17}$ being alkyl having from 1 to 6 carbon atoms, in an amount ranging from 0 to 25 weight percent, based on the acrylic resin (copolymer P), and optionally monomers from the group of the formula

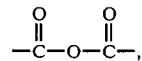

wherein $R_{19}$ is nitrile, phenyl, phenyl substituted by $C_1$-$C_4$ alkyl, or is —$CH_2$=$CH_2$, $R_{20}$ is hydrogen or methyl, and $R_{18}$ is hydrogen or together with $R_{19}$ forms an anhydride

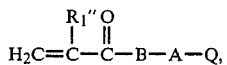

$R_{20}$ then being hydrogen, or wherein $R_{19}$ is

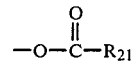

wherein $R_{21}$ is alkyl having from 1 to 6 carbon atoms, in an amount ranging from 0 to 25 weight percent, based on the acrylic resin (copolymer P), in addition to the monomers of formula I, subject to the condition that the Vicat softening temperature (in conformity with DIN 53 460) of the polymer P prepared from the monomers of formulas I, II (and optionally III and/or IV) is not below 65° C.

Particularly preferred are copolymers of methyl methacrylate (MMA) with compounds of formula I, and especially with further comonomers of formula II, for example the methyl ester of acrylic acid and the ethyl, butyl, ethylhexyl, or phenylethyl esters of acrylic and/or methacrylic acid. Generally the amount of methyl methacrylate should be at least 60 weight percent and preferably ranges from 65 to 90 weight percent, and more particularly is 75±10 weight percent, while the amount of the further comonomers of formula II ranges from 0 to 30 weight percent, and preferably from 5 to 25 weight percent, and more particularly is 18±5 weight percent, based on the copolymer P.

Moreover, compounds of formula III may be present as comonomers, for example hydroxyethyl or hydroxypropyl acrylate or methacrylate, or the corresponding alkyl ethers, and particularly the methyl and ethyl ethers, in an amount ranging from 0 to 25 weight percent, and preferably from 5 to 20 weight percent, based on the copolymer P.

Finally, one or more comonomers of formula IV, and particularly acrylonitrile, styrene and/or its alkyl derivatives such as alpha-methylstyrene or para-methylstyrene, and maleic anhydride, may be present in the copolymer in an amount ranging from 0 to 25 weight percent, the amount of the individual monomers of formula IV generally ranging from 2 to 15 weight percent.

However, the copolymers P may also be composed predominantly of monomers of formula II other than MMA, for example, ethyl methacrylate, isobutyl methacrylate, etc.

The acrylic resin forming the molding compound may also be an admixture of the copolymer P with other polyacrylates or polymethacrylates, for example the polymers prepared by polymerization or copolymerization of the monomers of formulas II to IV (in proportions corresponding to the copolymer P *without* monomers of formula I), the content of monomers of formula I of the total molding compound from which the layer to be protected is formed being not less than 0.1 weight percent, and preferably not less than 3 weight percent.

As a rule, the molecular weights of the acrylic resin, and more particularly of the copolymers P, will range from 10,000 to 500,000, and they preferably range from 120 to 220,000. The specific gravity will range from 1.3 to 2.3.

The substrate to be protected against UV light and used with acrylic resins as a protective layer is, in particular, polycarbonate.

As usually defined, polycarbonates are the products of condensation of carbonic acid with diols, and particularly with dioxydiphenylalkanes having a molecular weight greater than about 12,000. Particularly well suited are polymers derived from (4,4'-dihydroxydiphenyl)-2,2-propane and its derivatives replaced on the nucleus by halogen or alkyl. (See U.S. Pat. No. 3,582,398 and R. Vieweg and L. Goerden, Kunststoff-Handbuch, vol. VIII, Carl Hanser Verlag, Munich, 1972.)

Any of the polymerization methods employed in the manufacture of conventional molding compounds may be used to produce the thermoplastic molding compounds, and particularly the copolymers P. These are, above all, batchwise and continuous bulk polymerization (Winnacker-Kühler: Chemische Technologie, vol. 6, Organische Technologie II, page 414, Carl Hanser Verlag, 1982) and suspension polymerization (Schildknecht/Skeist, Polymerization Processes [volume 29 of High Polymers], Wiley-Interscience, 1977, page 133).

The initiators used are azo compounds (prototype, azoisobutyronitrile) or organic peroxides such as diaryl peroxide, or per esters (prototype, dibenzoyl peroxide or dialauryl peroxide). Peroxidicarbonates, on the other hand, are less well suited because of their reactivity to the mercaptans or thioethers used as chain termination agents. The type and amount of initiator used essentially depend on the kind of polymerization method chosen. The initiator will generally be used in an amount ranging from 0.01 to 1 weight percent, based on the total monomers. Especially with PMMA molding compounds, mercaptans such as alkyl mercaptans or esters of thioglycolic or mercaptopropionic acid and mono- or polyfunctional alcohols can be used as molecular weight regulators in amounts ranging from 0.1 to 1 weight percent, and usually from 0.2 to 0.5 weight percent. The lubricating or release agents used are the commonly used longer chain alcohols, esters or carboxylic acids, for example stearyl alcohol or stearic acid. The PMMA molding compounds impose no particular restrictions with regard to other possible additives such as antioxidants, flame retardants, etc.

The process will now be described in greater detail in terms of a batchwise bulk polymerization.

The additives are suitably dissolved in the monomer mixture and the solution is conveniently placed in foil pouches (cf. for example, Belgian Pat. No. 694,342). Polymerization is then carried out in a water bath at about 50° C. over a period of about 22 hours. To increase the final conversion, polymerization is advantageously continued in an air oven for about 10 hours with the temperature raised to about 110° C. The polymer can then be comminuted in the usual manner, following which it can be deaerated, for example by means of an extruder.

The production of formed multilayer synthetic resin bodies by coextrusion may be carried out in accordance with the prior art. (cf. British Pat. No. 2,028,228; J. E. Johnson in "Kunststoffberater", loc. cit.; D. Djordjevic in "Die Neue Verpackung" 7/78, pp. 1041-1046.) Multicomponent coextrusion dies of the usual type may be used. (cf. "Extrusionswerkzeuge für Kunststoffe", by W. Michaeli; Carl Hanser Verlag, 1979.) The thermoplastic molding compounds used as starting materials are used in a form and grade suited for extrusion, for example in granular or powdered form. The thermoplastic layer to be applied as a protective layer usually ranges in thickness from 10 to 100 microns and preferably ranges from 15 to 25 microns. The manufacture of coated double- and triple-walled panels is also carried out by the use of the extrusion technology developed therefor.

The drawbacks which usually attend the use of UV absorbers are overcome by the use of constituents providing protection against UV light in the form of polymerizable monomers according to the present invention. Evaporation in processing and on weathering thus is prevented.

The problems usually encountered in the coextrusion of coated double- and triple-walled panels, such as precipitation of the UV absorber on the shaping mechanism and subsequent impairment of the surface quality of the panels, erosion of the panel surface, etc., do not arise.

Surprisingly, the use of the monomers of formula I generally entails no problems, such as compatibility or homogeneity problems, in the coextrusion of molding compounds containing them. Adhesive properties, which usually are impaired because of the migration of components into the boundary surface between substrate and coating, remain good. Moreover, no detrimental plasticizer action is observed, nor are the optical and mechanical properties of the coated material adversely affected. The surface remains uncorroded even after prolonged exposure to the weather. The resistance to solvents is remarkable. A further advantage is that the monomers of formula I are easy to handle and readily miscible with the monomers of formulas II, III or IV or, optionally, with prepolymers thereof.

The Examples which follow will serve to illustrate the invention.

EXAMPLE 1

Preparation of copolymers P1-P24 in accordance with the invention 72 parts by weight of methyl methacrylate, 18 parts of butyl methacrylate, and 10 parts of 2-(alphacyano-beta, beta-diphenyl-acryloyloxy)-ethyl-1-methacrylate (monomer IA) to which 0.36 part of dodecyl mercaptan and 0.2 part of dilauroyl peroxide have been added are polymerized in a water bath at 50° C. for 22 hours. After further heating at 110° C. for 10 hours, a clear, yellowish material with a reduced viscosity $\eta_{sp}/c$ of 65 ml/g (20° C., CHCl$_3$) is obtained. (The determination of $\eta_{sp}/c$, in ml/g, is carried out at all times at 20° C. in CHC$_{13}$. With regard to the method of its determination, see Zeitschrift f. Elektrochemie 1937, p. 479.)

The copolymers P2-P24 listed in Table I which follow can be prepared by the same procedure. The monomers listed below which comprise in their molecule groups, structures or constituents providing protection against UV light (monomers of formula I) are identified in the Table by the following abbreviations:

Monomer IA: 2-(alpha-cyano-beta,beta-diphenylacryloyloxy) ethyl-1-methacrylate
IB: 2-(2'-hydroxy-3'methacrylamidomethyl-5'-octyl-phenyl)benzotriazole
IC: 2-hydroxy-4-(2-hydroxy-3-methacryloyloxy)-propoxybenzophenone
ID: 2-(alpha-cyano-beta,beta-diphenylacryloyloxy) ethyl-1-methacrylamide
IE: 2-hydroxy-4-methacryloyloxybenzophenone
IF: 2-hydroxy-4-acryloyloxyethyloxybenzophenone
IG: N-(4-methacryloylphenol)-N'-(2-ethylphenyl) oxalic acid diamide (type "SANDUVOR" of Sandoz AG)
IH: 4-ethyl-alpha-cyano-beta-phenylcinnamic vinyl ester
IJ: 2-(2-hydroxy-5-vinylphenyl)-2-benzotriazole
IK: phenyl-5-methacroyloxymethyl-salicylate
IL: ethyl-p-acryl aminobenzoate
IM: 6,8-dimethyl-4-oxo-5-chromanyl-methyl acrylate.

EXAMPLE 2

Production of polycarbonate panels with good transparency and good weatherability which are coated with the PMMA-based copolymer P1

In accordance with the invention, good weather resistance is obtained by coating with a thin film of copolymer P1 in which 10 weight percent of monomer IA, based on the thermoplastic PMMA resin, has been incorporated by polymerization as a constituent providing protection against UV light. To preserve the toughness properties of the polycarbonate panels, the PMMA layer should not be thicker than 30 microns and preferably is 20 microns.

A crystal clear continuous polycarbonate sheet 400 mm wide and 3 mm thick is formed in a three layer coextrusion die (see, for example, multilayer dies in "Extrusionswerkzeuge für Kunststoffe", by W. Michaeli, Carl Hanser Verlag, 1979) at a temperature of 270° C. at the entrance to the die at the rate of 0.4 meter/minute. At the same time the sheet is coated with the copolymer P 1 in the die. An adjustable retention bar in the die provides conventional thickness control for the PMMA layer. The copolymer P 1 is fed to the PMMA extru.der in granular form.

TABLE I

| | Composition of Copolymer P (percent by weight) | | | | $\eta_{sp}/c$ (ml/g) at 20° C. CHCl$_3$ |
|---|---|---|---|---|---|
| Copolymer | Monomer I | Monomers II–IV | | | |
| P2 | IB (8) | Methyl methacrylate (74) | Butyl methacrylate (18) | | 62 |
| P3 | IC (7) | Methyl methacrylate (73) | Butyl methacrylate (20) | | 93 |
| P4 | ID (9) | Methyl methacrylate (67) | Butyl methacrylate (18) | Methyl acrylate (3) Styrene (3) | 93 |
| P5 | IB (8) | Methyl methacrylate (70) | Methyl acrylate (22) | | 138 |
| P6 | IE (12) | Methyl methacrylate (68) | Methyl acrylate (20) | | 111 |
| P7 | IA (10) | Methyl methacrylate (72) | Ethyl acrylate (18) | | 120 |
| P8 | IF (10) | Methyl methacrylate (72) | Ethyl acrylate (18) | | 141 |
| P9 | IA (10) | Methyl methacrylate (72.5) | Butyl acrylate (17.5) | | 153 |
| P10 | IA (10) | Methyl methacrylate (77) | Butyl acrylate (13) | | 110 |
| P11 | IB (8) | Methyl methacrylate (72) | Butyl acrylate (20) | | 137 |
| P12 | IB (8) | Methyl methacrylate (77) | Butyl acrylate (15) | | 98 |
| P13 | IG (8) | Methyl methacrylate (85) | 2-Ethylhexyl (7) methacrylate | | 137 |
| P14 | IH (10) | Methyl methacrylate (73) | Phenylethyl (17) methacrylate | | 97 |
| P15 | IE (10) | Methyl methacrylate (82) | Hydroxypropyl (8) methacrylate | | 89 |
| P16 | IF (9) | Methyl methacrylate (76) | Ethoxyethyl (15) methacrylate | | 98 |
| P17 | IG (11) | Methyl methacrylate (76) | Acrylonitrile (13) | | 98 |
| P18 | IJ (13) | Methyl methacrylate (65) | Maleic anhydride (9) | Styrene (13) | 74 |
| P19 | IA (10) | Ethyl methacrylate (90) | | | 132 |
| P20 | IB (8) | Ethyl methacrylate (92) | | | 120 |
| P21 | IA (8) | Isobutyl methacrylate (92) | | | 136 |
| P22 | IK (12) | methyl methacrylate (70) | Butylacrylate (18) | | 77 |
| P23 | IL (6) | methyl methacrylate (73) | Decylacrylate (21) | | 72 |
| P24 | IM (8) | methyl methacrylate (72) | 2-Ethyl hexylacrylate (20) | | 68 |

Ad.
IA c.f. U.S. Pat. No. 4 178 303
IB c.f. U.S. Pat. No. 3 399 173
IC commercial product PERMASORB MA (Delft National Chemie, Zutphen. NL, or National Starch and Chemical Corporation, Bridgewater N.J.)
ID For identification: Thin layer chromatography on silica plates, solvent: CH$_2$Cl$_2$, R$_f$value = 0.1
IE, IF c.f. J. Appl. Polym. Sci. 27 (7) 2605 (1982)
IG reaction product of SANDUVOR UV 3525/679 (of Sandoz AG., Bale) with methacrylic anhydride
IH c.f. Polymer preprints, ACS-Division of Polymer Chemistry 21 (1) 201 (1980), Polymer J. (Japan) 13, 521 (1981)
IJ c.f. Revue Roumaine de Chimie 25 (7) 1123 (1980), Makromol. Chem. 183, 259 (1982)
IK c.f. J. Appl. Polym. Sc. 9, 903 (1965)
IL c.f. GB-Patent 898.065
IM c.f. Makromol. Chem. 180, (3) 625 (1979)

The polymer is advantageously comminuted in a disk attrition mill or a hammer mill and may be deaerated in a vented extruder (at about 220° to 240° C.)

EXAMPLE 3

Production of coated double- or triple-walled panels

Double- and triple-walled panels (hollowed chamber sectioned panels) are sectioned panels which are already on the market and in which two bounding surfaces, optionally with an intermediate layer, are uniformly spaced apart by regularly disposed webs. (Cf. published German patent application DOS No. 16 10 777).

A crystal clear double-walled panel 120 cm wide and 10 mm thick is formed in a three layer coextrusion die at a temperture of 270° C. at the entrance to the die and at the same time coated on one exterior surface with the copolymer P1. The coating thickness is 25 microns, and the strand moves at the rate of 0.8 meter/minute. After it has emerged from the die, the strand is cooled in a vacuum shaping mechanism (temperature, 70° C.) to a level below the glass transistion temperature.

The surface of the shaping mechanism show no buildup. The surface quality is the same as that of a polycarbonate double-walled panel without coating. Triple-walled panels can be produced in the same manner.

What is claimed is:

1. A method for making a formed multilayer synthetic resin body having at least one layer which is to be protected from incident ultraviolet light and at least one protective layer which absorbs incident ultraviolet light, which method comprises coextruding said body from a plurality of thermoplastic molding compounds, said protective layer being formed by extrusion of a first molding compound comprising from 51 to 100 percent by weight of a copolymer having polymerized therein at least one comonomer the molecule of which contains a group or structure which protects against ultraviolet light because of its characteristic absorption of ultraviolet light.

2. A method as in claim 1 wherein said protective layer is extruded as the outermost layer of said body and is directly adjacent the layer to be protected.

3. A method as in claim 2 wherein said layer to be protected is a layer of a polycarbonate resin.

4. A method as in claim 1 wherein said copolymer is an acrylic copolymer.

5. A method as in claim 1 wherein said monomer or monomers absorb at least 10 percent of incident ultraviolet light in the wavelength range from 250 to 350 nanometers when present in chloroform at a concentration of 0.002 percent and in a layer 5 millimeters thick.

6. A method as in claim 1 wherein said monomer is a vinyl or vinylidene monomer of the formula

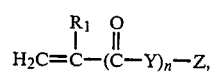

wherein $R_1$ is hydrogen or methyl, n is 0 or 1, Y is oxygen or $-NR_2-$ wherein $R_2$ is hydrogen or $(C_1-C_6)$alkyl, and Z is (a) a 2-hydroxybenzylphenyltriazole of the formula

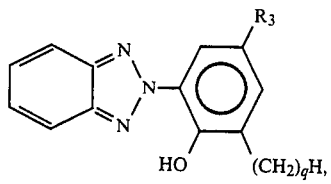

wherein $R_3$ is hydrogen or $(C_1-C_{12})$alkyl and q is 0 or an integer from 1 to 4, or Z is such a compound which is halogen substituted or is such a compound wherein benzotriazole is substituted by $(C_1-C_4)$ alkyl, wherein such Z may be linked into the monomer by way of the hydroxy oxygen if n is 0, by way of $-(CH_2)q-$ where q is other than 0, or directly by way of phenyl when q is 0;

(b) a 2-hydroxybenzophenone or 2-hydroxyacetophenone of the formula

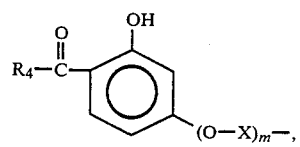

wherein m is 0 or 1, X is $(C_1-C_4)$-alkylene or such alkylene substituted by hydroxy, and $R_4$ is phenyl or methyl;

(c) an alpha-cyano-beta, beta-acryloyloxy compound of the formula

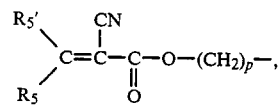

wherein p is an integer from 1 to 4 and $R_5$ and $R_5'$ are independently phenyl or phenyl substituted by $(C_1-C_4)$-alkyl;

(d) a benzoic acid ester of the formula

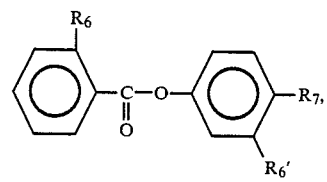

wherein one of $R_6$ and $R_6'$ is hydroxy and the other is hydrogen, $R_7$ is hydrogen or $(C_1-C_{10})$-alkyl, and this Z may be linked into the monomer by way of any unsubstituted position in either phenyl;

(e) an oxalanilide of the formula

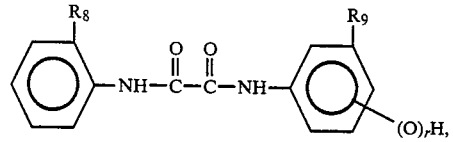

wherein $R_8$ and $R_9$ are hydrogen, $(C_1-C_8)$-alkyl, or $(C_1-C_8)$-alkoxy, r is 0 or 1, and this Z may be linked into the monomer by way of the hydroxy oxygen when r is 1 and when n is 0 or by way of any unsubstituted position in either phenyl when r is 0 or 1;

(f) when q is 0, para-aminobenzoyloxy of the formula

wherein $R_{10}$ and $R_{11}$ are hydrogen or $(C_1-C_6)$-alkyl; and (g) 6,8-dialkyl-4-oxo-5-chromoanyl of the formula

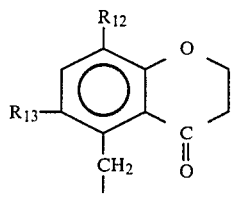

wherein $R_{12}$ and $R_{13}$ are $(C_1-C_4)$-alkyl.

7. A method as in claim 6 wherein Z is a 2-hydroxybenzylphenyltriazole of the formula

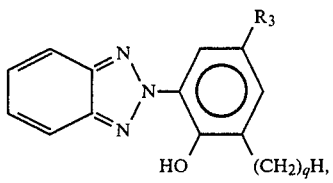

wherein $R_3$ is hydrogen or $(C_1-C_{12})$alkyl and q is 0 or an integer from 1 to 4, or Z is such a compound which is halogen substituted or is such a compound wherein benzotriazole is substituted by $(C_1-C_4)$alkyl, wherein such Z may be linked into the monomer by way of the hydroxy oxygen if q is 0, by way of $-(CH_2)_q-$ where q is other than 0, or directly by way of phenyl when q is 0.

8. A method as in claim 6 wherein Z is a 2-hydroxybenzophenone or 2-hydroxyacetophenone of the formula

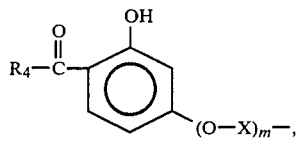

wherein m is 0 or 1, X is $(C_1-C_4)$-alkylene or such alkylene substituted by hydroxy, and $R_4$ is phenyl or methyl.

9. A method as in claim 6 wherein Z is an alpha-cyano-beta, beta-acryloyloxy compound of the formula

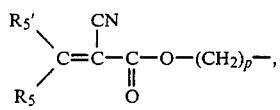

wherein p is an integer from 1 to 4 and $R_5$ and $R_5'$ are independently phenyl or phenyl substituted by $(C_1-C_4)$-alkyl.

10. A method as in claim 6 wherein Z is an oxalanilide of the formula

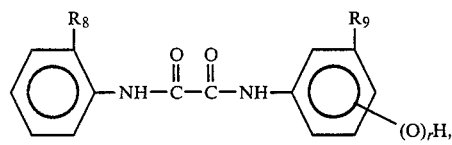

wherein $R_8$ and $R_9$ are hydrogen, $(C_1-C_8)$-alkyl, or $(C_1-C_8)$-alkoxy, r is 0 or 1, and this Z may be linked into the monomer by way of the hydroxy oxygen when r is 1 and when n is 0 or by way of any unsubstituted position in either phenyl when r is 0 or 1.

11. A method as in claim 1 wherein said monomer is present in an amount from 0.1 to 20 percent by weight of said first molding compound.

12. A method as in claim 1 wherein said monomer is present in an amount from 3 to 12 percent by weight of said first molding compound.

13. A method as in claim 1 wherein said protective layer is from 10 to 100 microns thick.

14. A method as in claim 1 wherein said protective layer is from 15 to 25 microns thick.

15. A formed multilayer synthetic resin body made by the method of claim 1.

16. A formed multilayer synthetic resin body made by the method of claim 6.

* * * * *